United States Patent Office 3,316,323
Patented Apr. 25, 1967

3,316,323
ELASTIC MOLDED PIECES AND COATINGS FROM EPOXY RESINS
Hans Wille, Herongen, and Karl Jellinek, Duisburg-Meiderich, Germany, assignors to Rutgerswerke und Teerverwertung Aktiengesellschaft, Frankfurt am Main, Germany
No Drawing. Filed Dec. 8, 1964, Ser. No. 416,924
Claims priority, application Germany, Dec. 13, 1963, G 39,381
4 Claims. (Cl. 260—830)

This invention relates to elastic molded articles and coatings from epoxide resins and a process for preparing them.

More particularly the invention relates to elastic molded articles and coatings from flexible epoxide resins, said articles and coating being distinguished by low absorption values of humidity. The starting material of the process according to the invention consists of diglycidyl ethers of polyhydric phenols or novolaks and aliphatic polyetheralcoholdiglycidylethers and in carrying out the process hardening agents are used in conventional manner.

Processes for preparing molded bodies from bisphenol-epichlorhydrin-epoxide resins, which are hardenable in the cold or in the heat, with the use of polyamines, polyamides and polycarboxylic acid anhydrides have been known previously. However, due to the hard-elastic characteristics of such pure, unmodified, hardened epoxide resins, the products resulting from these processes have in many cases disadvantageous properties, for example the formation of cracks due to tension in castings.

It has been, therefore, already suggested to prepare molded articles or bodies of improved flexibility from epoxy resins by the addition of so-called "outer softening agents," such as phthalic acid ester, adipic acid ester or sebacic acid ester, to the epoxy resins. However, the molded pieces thus obtained have the disadvantage that they become brittle, due to the gradual exudation of the softening agent.

Although by the use of "inner softening," i.e. by hardening or curing of diglycidyl ethers of polyhydric phenols with the addition of aliphatic polyetheralcoholdiglycidyl ethers—for example polyethyleneglycoldiglycidylether—together with conventional hardening agents molded pieces having satisfactory elastic properties are obtained, the water-absorption values of such pieces considerably exceed the water-absorption values of molded pieces obtained from pure, unmodified bisphenol-epoxy resins. Therefore, this procedure cannot be practically used for example for rendering flexible polyethylene- or polypropylene-glycoldiglycidylethers by the incorporation of more than 30–40% of said materials as softening agents, because the water absorption values of the hardened, molded pieces are higher than 10%. Molded pieces having such high water-absorption values are not suitable e.g. for purposes of electrical engineering.

It has now been found that elastic molded, hardened, flexible bodies or coatings distinguished by surprisingly low absorption of humidity can be obtained by the use of polyethyleneglycoldiglycidylethers of the formula

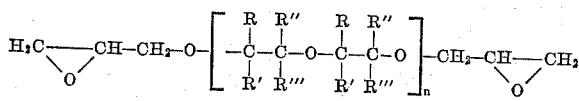

(I)

in which the α-position as well as the α'-position, carries within the polyethyleneglycol chain to each ether oxygen atom, alkyl-, alkylene-, aralkyl- and/or aryl side chains and the α-position, as well as the α'-position is occupied by at least one of these substituents and R, R', R'', R''' denote, for example, hydrogen or methyl-, ethyl-, propyl-, vinyl-, aralkyl-, such as, for example, benzyl-, or aryl-, such as phenyl-, toluyl-, naphthyl- radicals and the like, and n denotes an integer, such as 1, 2, 3, 4, 5, 6, etc., in mixture with phenolic epoxy resins, by hardening with one or more of the agents known from the art of hardening epoxy resins.

The rather low water absorption of the molded materials obtained in the manner outlined above, was particularly unexpected in view of the fact that upon occupation of only one α-position to every etheroxygen atom within the polyethyleneglycol chain, results in products which show practically equally high water absorption values as the unsubstituted polyethyleneglycoldiglycidylethers.

As the phenolic epoxy resins to be mixed according to this invention with polyetheralcoholdiglycidyl ethers, reaction products prepared according to processes known per se from di- or polyphenols, such as resorcinol, hydroquinone. 4,4'-dihydroxydiphenyldimethylmethane, 4,4'-dihydroxydiphenylmethane, phenolformaldehyde condensation products which are known in commerce under the name "novolak," reaction products of phenols and α, β unsaturated aldehydes, such as acrolein or crotonaldehyde, and others, with epichlorhydrin or dichlorhydrins in the presence of stoichiometric amounts of NaOH or KOH, can be used.

The mixing proportion of the phenolic epoxy resins with the polyethyleneglycolglycidylethers according to the present invention is in the range between 99:1 and 10:90, particularly 95:5 and 30:70.

As hardening agents for the mixtures according to the invention, aliphatic, cycloaliphatic or aromatic polycarboxylic acid anhydrides, Friedel-Crafts catalysts such as $BF_3$, $BF_3$-adducts, and also phenol-, urea- and melamine-formaldehyde resins can be used, with or without the addition of acid or basic catalysts. Even at very high contents in polyethyleneglycoldiglycidyl ethers according to the present invention in mixture with phenolic epoxy resins, the water-absorption values do not exceed about 2% in 4 weeks at 25° C.

The epoxide resin masses prepared according to this invention are highly suitable e.g. for use in electrical engineering, machine-tool industry and model construction.

The following Examples 1–6 describe some specific embodiments of the invention, to which the invention is not limited. The attached table contains comparative tests of water-absorption. Tests A, B, C, D, E, F were carried out with molded materials prepared according to Examples 1–6. Molded materials G, H and I which were prepared with the use of polyethylene-, and polypropyleneglycoldiglycidylethers, show impracticably high water-absorption values.

*Example 1*

70 parts by weight of 4,4'-dihydroxydiphenyldimethylmethane-diglycidylether having an epoxide-equivalent of 186 are mixed, with 30 parts by weight of a poly-(1,2-dimethylethyleneglycol)-diglycidylether having an average molecular weight of 600 and subsequently 11 parts by weight of triethylenetetramine are added. Hardening is carried out in 24 hours at room temperature of about 18–20° C. and by subsequent tempering at 100° C. for one hour.

The resulting hardened body has the following physical characteristics:

Limiting bending stress __ 680 kg. (weight)/cm.$^2$.
Impact strength _____ 40–43 cm. kg. (weight)/cm.$^2$.
Specific resistance _____ 10$^{16}$ Ω cm.
Creep stress _____ T5.

Water absorption: see "A" in the Table.

Example 2

50 parts by weight of the epoxide resin prepared as described in Example 1, are subjected to hardening for 24 hours with 50 parts by weight of a poly-(1,2-dimethyl-ethyleneglycol)-diglycidylether having an average molecular weight of 400 and 8 parts by weight of triethylenetetramine at room temperature, and subsequently tempered by heating to 100° C. for one hour.

The resulting hardened body has the following physical characteristics:

Limiting bending stress ____ 115 kg. (weight)/cm.$^2$.
Impact strength _____ >50 cm. kg. (weight)/cm.$^2$.
Specific resistance _____ 5.10$^{15}$ Ω cm.
Creep stress _____ T5.

Water absorption: see "B" in the Table.

Example 3

80 parts by weight of the epoxide resin prepared as described in Example 1, are mixed with 20 parts by weight of poly-(1,2-dimethylethyleneglycol)-diglycidylether (having an average molecular weight of 600) and 12 parts by weight of triethylenetetramine. Hardening is carried out in the manner described in Example 1.

The water absorption is stated in the Table under "C."

Example 4

50 parts by weight of epoxide resin described in Example 1 are mixed with 50 parts by weight of poly-(1-methyl - 2 - ethylethyleneglycol)-diglycidylether (average molecular weight 800) and hardened by mixing with 8 parts by weight of triethylenetetramine within 24 hours at room temperature and treatment at 100° C. for one additional hour.

The water absorption is stated in the Table (further below) under "D."

Example 5

50 parts by weight of epoxy resin prepared in accordance with Example 1, are mixed with 50 parts by weight of poly - (1,2 - dimethylethyleneglycol) - diglycidylether (having an average molecular weight of 600) and with 50 parts by weight of hexahydrophthalic acid anhydride and 1 part by weight of 2,4,6-tris-(dimethylaminomethylphenol) and subjected to hardening at 120° C. for 10 hours.

Water absorption: see "E" in the Table.

Example 6

60 parts by weight of an epoxydized phenol-novolak having an epoxide equivalent of 174 and an epoxide-group-functionality of 3,4, are mixed with 40 parts by weight of poly-(1,2-dimethylethyleneglycol)-diglycidylether (having an average molecular weight of 600) and 60 parts by weight of hexahydrophthalic acid anhydride and 1 part by weight of benzyldimethylamine and reacted at 120° C. for 10 hours and at 180° C. for 3 hours.

The water absorption of the resulting body is stated in the Table further below under "F."

The following tests serve merely for comparison.

In Tests (a) and (b) a non-substituted, in Test (c) a polyethyleneglycoldiglycidylether substituted in the 1-position only, was used. Test (d) illustrates by way of comparison the hardening of a pure unmodified epoxy resin.

Test (a)

70 parts by weight of the epoxy resin prepared in the manner described in Example 1 are mixed with 30 parts by weight of a polyethyleneglycoldiglycidylether having an average molecular weight of 700, 60 parts by weight of hexahydrophthalic acid anhydride and 1 part by weight of benzyldimethylamine and subjected to hardening for 10 hours at 120° C.

The water absorption values are stated in the Table under "G."

Test (b)

70 parts by weight of the epoxy resin prepared in the manner described in the above Example 1, are mixed with 30 parts by weight of polyethyleneglycoldiglycidylether (having an average molecular weight of 600) and 11 parts by weight of triethylenetetramine. Hardening is brought about first at room temperature during 24 hours and then by subsequent tempering at 100° C. for one hour.

The water absorption values are stated in the Table under "H."

Test (c)

60 parts by weight of the epoxy resin prepared in the manner described in Example 1, are mixed with 40 parts by weight of poly-(1-methylethyleneglycol)-diglycidylether (having a molecular weight of 450) and with 9 parts by weight of triethylenetetramine. Hardening is brought about at ordinary room temperature during 24 hours and then heating at 100° C. for one hour.

The water absorption values are shown in the Table under "I."

Test (d)

100 parts by weight of the epoxy resin prepared according to Example 1, are mixed with 13 parts by weight of triethylenetetramine, hardened at room temperature for 24 hours and then tempered by heating at 100° C. for one hour.

The water absorption values are shown in the table under "K."

It will be appreciated that this invention is not limited to the specific embodiments described in the above examples and can be carried out with various modifications without departing from the scope of the invention. Thus, instead of the specific epoxide resins used as starting materials in the examples, any of the other epoxide resins disclosed above can be used substantially in the same manner as described in said examples. Furthermore, any of the polyethyleneglycoldiglycidyl ethers corresponding to the above Formula I can serve for carrying out this invention, substantially in the manner described in the examples. As already mentioned above, in carrying out this invention any conventional hardening agent can be used, in addition to those mentioned in Examples 1–6. Several hardening agents can also be used. Hardening of the epoxy resins prepared according to the invention can be carried out at temperatures between 0° and 200° C. Hardening with simultaneous application of heat and pressure may be also applied. The proportions in which the hardening agents are added to the reaction mixture, depend on the nature and chemical composition of the respective hardening agent or agents and are calculated in known manner. The preferable proportion of curing agent to resin is the stoichiometric one.

The preparation of polyethyleneglycoldiglycidyl ethers of the above Formula I is made by a two-step process well known in technical literature. In the first step of the reaction the corresponding polyethyleneglycols are reacted in the presence of Friedel-Crafts catalysts to dichlorhydrine derivatives. In the second step these are treated with sodium hydroxide and transferred to the diglycidylethers.

The parts and percentages described herein are by weight if not otherwise stated.

TABLE.—WATER ABSORPTION OF FLEXIBLE MOLDED EPOXY RESIN MATERIALS AT 25° C. AND 100° C.

[Measured on standard bars of 120 x 15 x 10 mm. Water-absorption (in percent)]

| Molded Material | At 25° C. after (weeks)— | | | | | | | | At 100° C. after (hours)— | | | | |
|---|---|---|---|---|---|---|---|---|---|---|---|---|---|
| | 2 | 4 | 6 | 8 | 10 | 20 | 30 | 40 | 6 | 12 | 18 | 24 | 100 |
| A | 0.80 | 1.22 | 1.43 | 1.65 | 1.81 | 2.41 | 2.63 | 2.72 | 1.5 | 2.1 | 2.5 | 2.9 | 3.7 |
| B | 1.20 | 1.71 | 2.61 | 2.83 | 3.05 | 3.45 | 3.80 | 3.91 | 1.7 | 2.5 | 3.1 | 3.5 | 5.0 |
| C | 0.40 | 0.62 | 0.85 | 0.93 | 1.20 | 1.39 | 1.47 | 1.51 | 1.16 | 1.89 | 2.1 | 2.3 | 3.1 |
| D | 0.93 | 1.35 | 1.56 | 1.78 | 2.01 | 2.65 | 2.83 | 3.01 | 1.6 | 2.3 | 2.7 | 3.09 | 4.1 |
| E | 0.97 | 1.05 | 1.20 | 1.23 | 1.29 | 1.35 | 1.51 | 1.63 | 1.2 | 1.6 | 1.8 | 1.9 | 2.1 |
| F | 0.42 | 0.61 | 0.77 | 0.85 | 0.98 | 1.10 | 1.15 | 1.23 | 0.75 | 1.38 | 1.53 | 1.61 | 1.7 |
| G | 5.3 | 6.0 | 7.8 | 9.2 | 10.5 | 12.3 | 12.5 | 12.3 | 2.5 | 4.3 | 5.0 | 6.7 | 8.5 |
| H | 10.0 | 12.1 | 15.3 | 17.1 | 19.3 | 20.7 | 22.6 | 23.7 | 5.0 | 8.7 | 9.6 | 12.3 | 17 |
| I | 15.0 | 17.2 | 20.0 | 21.5 | 20.0 | 23.5 | 22.9 | 24.0 | 5.6 | 9.2 | 9.7 | 13.0 | 16.5 |
| K | 0.30 | 0.41 | 0.52 | 0.61 | 0.73 | 0.85 | 1.15 | 1.27 | 0.25 | 0.52 | 0.87 | 1.15 | 2.3 |

What we claim is:

1. A process for preparing from epoxy resins elastic molded bodies and coatings, having low humidity absorption characteristics, comprising mixing an epoxy resin selected from the group consisting of diglycidylethers of polyhydric phenols and epoxylated novolak resins, with an aliphatic polyetheralcohol diglycidylether consisting of a polyethyleneglycoldiglycidylether corresponding to the formula

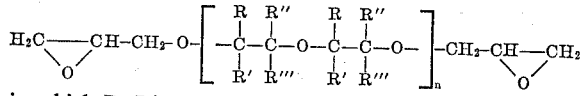

in which R, R', R'' and R''' are selected from the group consisting of H, alkyl-, alkenyl-, aralkyl- and aryl radicals and $n$ stands for an integer, and in which the $\alpha$ as well as the $\alpha'$ position to each ether oxygen atom within the polyethylene glycol chain is in each case occupied with at least one other substituent than H, selected from the group consisting of alkyl, alkenyl, aralkyl and aryl, and with a hardening agent for epoxy resins and the mixture is subjected to hardening.

2. A process as claimed in claim 1, in which hardening is carried out by ordinary room temperature and subsequently at increased temperature.

3. A process as claimed in claim 1, in which hardening is carried out at increased temperature.

4. Cured, elastic epoxy resins having low humidity absorption characteristics essentially consisting of the hardened mixture of an epoxy resin selected from the group consisting of diglycidylethers of polyhydric phenols and epoxylated novolak resins, with an aliphatic polyetheralcohol diglycidylether consisting of a polyethyleneglycol-diglycidylether corresponding to the formula

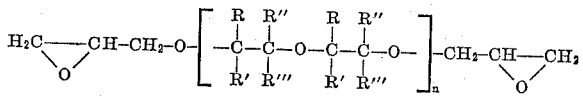

in which R, R', R'' and R''' are selected from the group consisting of H, alkyl-, alkenyl-, aralkyl- and aryl radicals and $n$ stands for an integer, and in which the $\alpha$ as well as the $\alpha'$ position to each ether oxygen atom within the polyethylene glycol chain is in each case occupied with at least one other substituent than H, selected from the group consisting of alkyl, alkenyl, aralkyl and aryl, and with a hardening agent for epoxy resins.

References Cited by the Examiner
UNITED STATES PATENTS 2,512,997 6/1950 Bixler _____ 260—47 X
2,870,099 1/1959 Borrows et al. _____ 260—2
3,029,286 4/1962 Bressler et al. _____ 260—47

OTHER REFERENCES

Willie et al.: German patent application 1,143,023, published Jan. 31, 1963.

WILLIAM H. SHORT, *Primary Examiner.*

T. D. KERWIN, *Assistant Examiner.*